United States Patent

Albrecht et al.

[15] 3,673,191
[45] June 27, 1972

[54] BIS-BASIC ETHERS AND THIOETHERS OF DIBENZOTHIOPHENE

[72] Inventors: William L. Albrecht; Robert W. Fleming; Stephen W. Horgan, all of Cincinnati, Ohio

[73] Assignee: Richards-Merrell, Inc., New York, N.Y.

[22] Filed: Feb. 18, 1970

[21] Appl. No.: 12,428

[52] U.S. Cl. ............. 260/293.57, 260/329.3, 260/326.5 SA, 260/246 B, 260/268 TR, 424/267, 424/275, 424/274, 424/248, 424/250
[51] Int. Cl. ......................................................... C07d 29/36
[58] Field of Search ............... 260/329.3, 293.4 D, 326.5 SA, 260/326.84, 246 B, 268 TR, 293.57

[56] References Cited

UNITED STATES PATENTS

| | | | |
|---|---|---|---|
| 3,218,337 | 11/1965 | McCall et al. | 260/329.3 |
| 3,565,956 | 2/1971 | Schulenberg et al. | 260/293.4 D |
| 3,558,616 | 1/1971 | Brandstrom et al. | 260/326.5 SA |

*Primary Examiner*—Henry R. Jiles
*Assistant Examiner*—S. D. Winters
*Attorney*—Harvey W. Edelblute and George W. Rauchfuss, Jr.

[57] ABSTRACT

The novel bis-basic ethers and thioethers of dibenzothiophene of the present invention have useful antiviral properties. These new compounds are represented by the formula

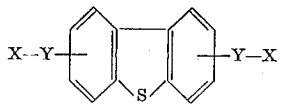

Formula I wherein each Y is oxygen or divalent sulfur; and each X is (A) the group

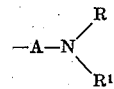

wherein each A is a straight or branched alkylene chain having from two to eight carbon atoms and which separates the amino nitrogen and Y by at least two carbon atoms; R and $R^1$ are individually hydrogen, (lower)alkyl having from one to six carbon atoms, cycloalkyl having from three to six carbon atoms, alkenyl having from three to six carbon atoms and having the vinyl unsaturation in other that the 1-position of the alkenyl group; or each set of R and $R^1$ taken together with the nitrogen atom to which they are attached is a saturated monocyclic heterocyclic group such as pyrrolidino, piperidino, morpholino, or N-(lower)alkylpiperazino; or (B) the group

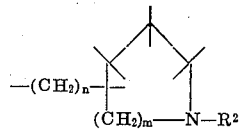

wherein *n* is a whole integer of from 0 to 2, *m* is 1 or 2, and $R^2$ is hydrogen, (lower)alkyl having from one to six carbon atoms, or alkenyl of from three to six carbon atoms and having the vinyl unsaturation in other than the 1-position of the alkenyl group.

This invention also includes pharmaceutically acceptable acid addition salts of the bases represented by Formula I. These new compounds may be prepared by several different methods which are described.

11 Claims, No Drawings

BIS-BASIC ETHERS AND THIOETHERS OF DIBENZOTHIOPHENE

This invention relates to new bis-basic ethers and thioethers of dibenzothiophene which have useful antiviral properties and to processes for preparing the same.

The new compounds of this invention are represented by the general formula

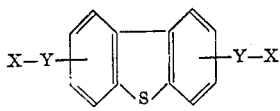

Formula I wherein each Y is oxygen or divalent sulfur; and each X is (A) the group

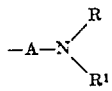

wherein each A is a straight or branched alkylene chain having from two to eight carbon atoms and which separates the amino nitrogen and Y by at least two carbon atoms; R and $R^1$ are individually hydrogen, (lower) alkyl having from one to six carbon atoms, cycloalkyl of from three to six carbon atoms, alkenyl of three to six carbon atoms and having the vinyl unsaturation in other than the 1-position of the alkenyl group; or each set of R and $R^1$ taken together with the nitrogen atom to which they are attached is a saturated monocyclic heterocyclic group such as pyrrolidino, piperidino, morpholino, or N-(lower)alkylpipera-zino; or (B) the group

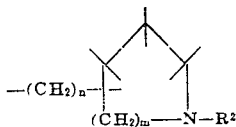

wherein $n$ is a whole integer of from 0 to 2, $m$ is 1 or 2, and $R^2$ is hydrogen, (lower) alkyl having from one to six carbon atoms, or alkenyl of from three to six carbon atoms and having the vinyl unsaturation in other than the 1-position of the alkenyl group.

The compounds of this invention include both the base form represented by Formula I and pharmaceutically acceptable acid addition salts of the base form.

As can be seen from the above general Formula I, one basic ether or thioether group, that is, —Y—X, is attached to each of the two benzenoid rings of the dibenzothiophene ring system. Thus one of these groups can be linked to the dibenzothiophene ring system by replacement of any one of the hydrogen atoms in positions 1 through 4, while the second of these groups can replace any one of the hydrogen atoms in positions 6 through 9. Preferably, one of the basic ether or thioether groups is in the 2- or 3- position of the dibenzothiophene ring system, while the remaining group is in the 7- or 8-position, and most preferably one of these groups is in the 2-position and the other is in the 8-position.

Although one of the two X groups on a compound of the above general Formula I can be

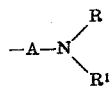

and the other can be the group

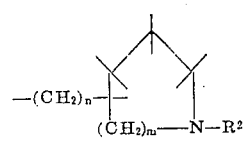

it is preferred that both X groups are the same as more fully shown by the following general Formulas II and III:

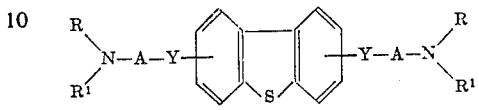

Formula II

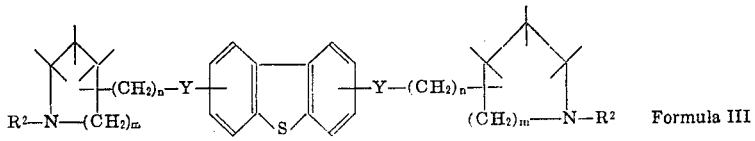

Formula III

In the above general Formulas II and III, the various groups Y, A, R, $R^1$, $R^2$, $n$ and $m$ have the same meanings given hereinbefore.

Each of the symbols A in the above Formula II is an alkylene group having from two to eight carbon atoms which can be straight chained, or branched chained, and which separates Y, that is, the ether oxygen or thioether sulfur, from the amino nitrogen by an alkylene chain of at least two carbon atoms. Each of the alkylene groups represented by A can be the same or different, although preferably both of these groups are the same. Illustrative of alkylene groups represented by A there can be mentioned for example: 1,2-ethylene, 1,3-propylene, 1,4-butylene, 1,5-pentylene, 1,6-hexylene, 2-methyl-1,4-butylene, 2-ethyl-1,4-butylene, 3-methyl-1,5-pentylene and the like. Preferably A is an alkylene group having from two to six carbon atoms.

In the compounds of Formula II each amino group, that is,

can be a primary, secondary or tertiary amino group. Each R and $R^1$ is individually hydrogen, (lower) alkyl having from one to six carbon atoms, cycloalkyl of from three to six carbon atoms, alkenyl of from three to six carbon atoms and having the vinyl unsaturation in other that the 1-position of the alkenyl group, or each set of R and $R^1$ taken together with the nitrogen atom to which they are attached is a saturated monocyclic heterocyclic group. Preferably each of the

groups is a tertiary amino group.

Illustrative of (lower)alkyls which can be represented by each R or $R^1$ in the compounds of Formula II, or $R^2$ in the compounds of Formula III there can be mentioned straight or branched chain alkyls, such as, for example: methyl, ethyl, n-propyl, isopropyl, n-butyl, secondary butyl, tertiary butyl, n-pentyl, isoamyl, n-hexyl and the like.

Illustrative of cycloalkyl groups which can be represented by each R and $R^1$ in the compounds of Formula II of the present invention there can be mentioned for example, cyclopropyl, cyclobutyl, cyclopentyl, cyclohexyl and the like.

Illustrative of alkenyl groups which can be represented by R, $R^1$, or $R^2$ of the compounds of the present invention there can be mentioned for example: allyl, 3-butenyl, 4-hexenyl and the like.

The heterocyclic groups which can be represented by each

group of Formula II are saturated monocyclic heterocyclic groups. These heterocyclic groups, in addition to the one nitrogen atom, can contain a second hetero atom, such as, for example, oxygen or nitrogen in the ring and four or five ring carbon atoms. The ring can be substituted with a (lower)-alkyl group, particularly, with an alkyl group having from one to three carbon atoms. As examples of suitable heterocyclic groups which are represented by R and $R^1$ taken together with the nitrogen atom to which they are attached there can be mentioned for example, pyrrolidino, piperidino, morpholino, N-(lower)alkylpiperazino, such as, N-methyl or N-ethyl-piperazino and the like.

Each R, $R^1$ or $R^2$ group can be the same or different in each of the basic ether or thioether groups attached to the dibenzothiophene ring system. Preferably, however, both of the R groups, $R^1$ groups or $R^2$ groups in each compound are the same. Preferred substituents for the R, $R^1$ and $R^2$ groups are alkyl radicals having from one to six carbon atoms.

Each of the saturated heterocyclic groups of the compounds of Formula III can be attached to Y through an alkylene linkage of one or two carbon atoms, for example, methylene or 1,2-ethylene, or each saturated heterocyclic group can be attached to Y through a ring carbon atom of the heterocyclic group when $n$ is zero. The saturated heterocyclic group is attached to either the alkylene group or Y through a carbon atom of the ring by replacement of one of the hydrogen atoms of the ring. The heterocyclic groups in the compounds represented by Formula III can be 5- or 6-membered rings, that is, $m$ is 1 or 2. As examples of various groups represented by

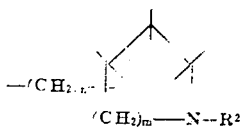

in the compounds of the present invention there can be mentioned for example: N-methyl-4-piperidyl, N-methyl-3-piperidyl, N-ethyl-3-pyrrolidyl, (N-methyl-4-piperidyl)methyl, (N-methyl-3-piperidyl)methyl, 2-(2-piperidyl)ethyl and the like.

As examples of base compounds of this invention which are represented by general Formula II there can be mentioned for example:

2,8-bis(4-aminobutoxy)dibenzothiophene,
2,8-bis[2-(diethylamino)ethylthio]dibenzothiophene,
3,7-bis[2-(diethylamino)ethoxy]dibenzothiophene,
2,8-bis[2-(diisopropylamino)ethoxy]dibenzothiophene,
2,8-bis[5-(di-n-propylamino)pentoxy]dibenzothiophene,
2,8-bis[3-(di-n-butylamino)propoxy]dibenzothiophene,
2,8-bis[3-(dimethylamino)-2-methylpropoxy]dibenzothiophene,
3,7-bis[3-(dimethylamino)propoxy]dibenzothiophene,
2,8-bis[3-(cyclohexylamino)propoxy]dibenzothiophene,
2,8-bis[6-(diallylamino)hexoxy]dibenzothiophene,
3,7-bis[2-(pyrrolidino)ethoxy]dibenzothiophene,
2,8-bis[2-(N-methyl-N-cyclohexylamino)ethoxy]dibenzothiophene,
2,8-bis[3-(piperidino)propoxy]dibenzothiophene and the like. As examples of base compounds of this invention which are represented by general Formula III there can be mentioned for example:

2,8-bis[2-(N-methyl-4-piperidyl)ethoxy]dibenzothiophene,
2,8-bis[2-(N-methyl-4-piperidyl)ethylthio]dibenzothiophene,
2,8-bis(N-methyl-4-piperidyloxy)dibenzothiophene,
3,7-bis[2-(N-methyl-4-piperidyl)ethoxy]dibenzothiophene,
2,8-bis(N-ethyl-3-pyrrolidyloxy)dibenzothiophene,
3,7-bis[(N-allyl-4-piperidyl)methoxy]dibenzothiophene and the like.

The pharmaceutically acceptable acid addition salts of the base compounds of this invention are those of any suitable inorganic or organic acids. Mono- or bis-acid addition salts can be formed, although in practice, the bis-salts are usually isolated. Also, the salts can be hydrated, for example, monohydrate, or substantially anhydrous. Suitable inorganic acids for preparing the salt form are, for example, mineral acids, such as, hydrochloric, hydrobromic, sulfuric or phosphoric acids and the like. Suitable organic acids are, for example, citric acid, malic acid, glycolic acid, lactic acid, tartaric acid, malonic acid, succinic acid, maleic acid, fumaric acid and the like.

The compounds of the present invention can be administered to prevent or inhibit infections of: picornaviruses, for example, encephalomyocarditis; myxoviruses, for example, Influenza $A_0$, $PR_8$; arboviruses, for example, Semliki Forest; and poxviruses, for example, Vaccinia IHD. When administered prior to infection, that is, prophylactically, it is preferred that the administration be within 0 to 96 hours prior to infection of the animal with pathogenic virus. When administered therapeutically to inhibit an infection, it is preferred that the administration be within about a day or two after infection with pathogenic virus.

The dosage administered will be dependent upon the virus for which treatment or prophylaxis is desired, the type of animal involved, its age, health, weight, extent of infection, kind of concurrent treatment, if any, frequency of treatment, and the nature of the effect desired. Illustratively, dosage levels of the administered active ingredients can be: intravenously, 0.1 to about 10 mg/kg; intraperitoneal, 0.1 to about 50 mg/kg; subcutaneous, 0.1 to about 250 mg/kg; orally, 0.1 to about 500 mg/kg and preferably about 1 to 250 mg/kg; intranasal instillation, 0.1 to about 10 mg/kg; and aerosol, 0.1 to about 10 mg/kg of animal body weight.

The compounds may be administered, dissolved or suspended, in any conventional non-toxic pharmaceutical carrier of the type that may be taken orally, applied topically, buccally or parenterally.

The compounds of the present invention may be prepared by various methods such as, for example, according to the methods described below in the several schemes illustrated by the equations and in the specific examples.

Scheme 1

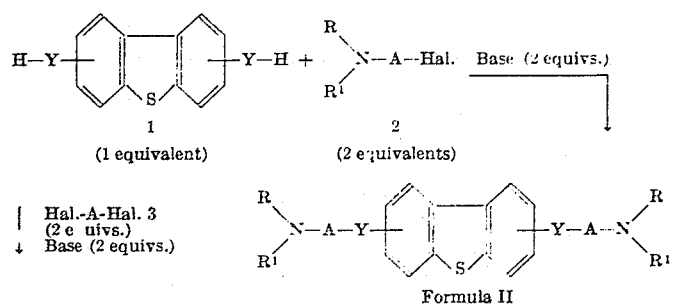

Formula II

Scheme 2

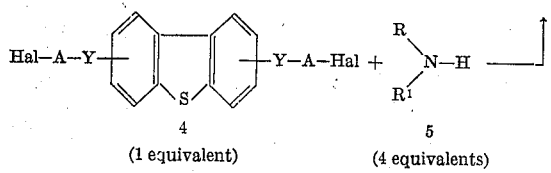

(1 equivalent)   (4 equivalents)

Scheme 3

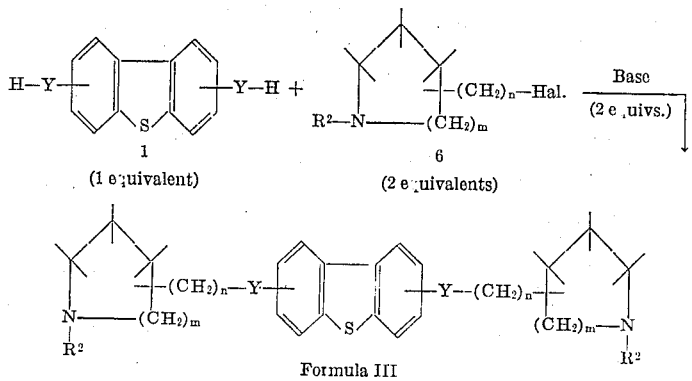

Formula III

In the above reaction schemes, Y, RR¹N-, A, R², m, and n have the same meanings specified hereinbefore, and each Hal. is Cl, Br or I.

Typical haloalkylamines, 2, useful in Scheme 1 are for example, N,N-diethyl-2-chloroethylamine, N-(2-chloroethyl)piperidine and the like. Typical dihaloalkanes, 3, useful in Scheme 2 are for example, 1-bromo-2-chloroethane, 1,6-dibromohexane and the like. Amines, 5, useful in Scheme 2 are primary amines such as, for example, ethylamine, or secondary amines, such as, for example, dimethylamine, or tertiary amines, such as, for example, hexamethylenetetramine and the like. Typical of the halogen substituted heterocyclic nitrogen compounds, 6, useful in Scheme 3 are for example, 3-chloromethyl-1-methylpiperidine and the like.

In the above reaction schemes, the base used may be for example, sodium methoxide, sodium hydride, sodium amide, sodium hydroxide, potassium hydroxide and the like. Solvents used as the reaction medium may vary over a wide range of solvent types and include aromatic hydrocarbons such as benzene, toluene, xylene and the like; halogenated aromatics, such as chlorobenzene and the like; aprotic solvents such as N,N-dimethylformamide, N,N-dimethylacetamide, dimethyl sulfoxide and the like; alcohols such as ethanol, isopropanol and the like; ketones such as acetone, butanone and the like; ethers such as tetrahydrofuran, dioxane and the like; water; or mixtures of solvents.

In the method of synthesis where either sodium methoxide, sodium amide or sodium hydride, for example, is used as the base, the reaction is carried out in an anhydrous medium, such as anhydrous toluene, chlorobenzene and the like. About 2.5 equivalents of the base is added to a suspension of, for example, 1 equivalent of compound 1 where Y is oxygen, in the anhydrous solvent, and the mixture heated to form the diphenoxide. In the case where sodium methoxide is used, the methanol formed may be removed advantageously by azeotropic distillation. About 2.5 equivalents of the halide, 2, 3 or 6, is then added and the mixture heated to reflux for a period which may vary from about 4 to 24 hours. The products, that is, compounds of Formula II or III and compound 4 are then isolated by customary procedures. Compounds of Formula II and III are usually isolated as bis-acid addition salts.

In the method where an alkali hydroxide, such as potassium hydroxide, for example, is used as the base, two different procedures may be used. In the one procedure a 25 to 50 percent aqueous solution of the alkali hydroxide (about 2.5 equivalents) is added to a suspension of, for example, 1 equivalent of compound 1 wherein Y is oxygen in a suitable aromatic solvent, such as, for example, xylene. This mixture is then heated to boiling, stirring being optional, and the water removed by azeotropic distillation, a convenient method being to collect the water in a device such as the Dean-Stark distilling receiver. The reaction mixture, now being essentially anhydrous, is treated with about 2.5 equivalents of the halide, compound 2, 3 or 6, as described above. In the other procedure the reaction is carried out in a heterogeneous medium of water and an aromatic hydrocarbon, such as, for example, toluene, xylene and the like. For example, 1 equivalent of compound 1 where Y is oxygen is suspended in the aromatic hydrocarbon. Then in Schemes 1 and 3, a solution of about 2.5 equivalents of a hydrohalide salt of the amino halide, that is, a hydrohalide salt of 2 or 6, in the minimum volume of water is added and with efficient stirring, a 25 to 50 percent solution of the alkali hydroxide (about 5 equivalents) is added. The mixture is heated to reflux for a period of about 6 to 24 hours, and the product isolated from the hydrocarbon layer. In Scheme 2, when the aqueous/aromatic hydrocarbon medium is used to prepare compounds of type 4, which contain no amine functions, the amount of alkali hydroxide used is only in slight excess of 2.0 equivalents per 1 equivalent of diphenol or dithiol, that is, compound 1 wherein Y is equal to oxygen or divalent sulfur.

In Scheme 2, the reaction between the bis(ω-haloalkyl) ether or thioether, 4, and the amine, 5, may be carried out under a variety of conditions. For example, the compound 4 may be heated together with a large excess of the amine, 5, the excess amine serving as both the reaction medium and the hydrohalide acceptor. This method is particularly suitable for readily available amines, the excess of which can be easily removed from the reaction mixture by, for example, distillation at reduced pressure or by steam distillation. Or, 1 equivalent of the bis(ω-haloalkyl) ether or thioether, 4, and 4 equivalents of the amine, 5, may be heated together in one of a number of different types of solvents, for example, in aromatic solvents, such as, benzene, toluene, xylene, chlorobenzene and the like; or lower molecular weight alcohols, such as, methanol, ethanol, isopropyl alcohol and the like; or lower molecular weight ketones, such as, acetone, methyl ethyl ketone and the like. The reaction between the halo compound and the amine is usually promoted by the addition of either sodium or potassium iodide, the iodide being used in either catalytic or stoichiometric amounts. In some cases, it maybe advantageous to use only two equivalents of the amine, 5, for each equivalent of the bis(ω-haloalkyl) ether or thioether, 4, an excess of either powdered sodium or potassium carbonate being used as the acceptor for the hydrohalide generated. In the case of volatile amines, this reaction may be best carried out under pressure in a suitable bomb or autoclave.

Scheme 4

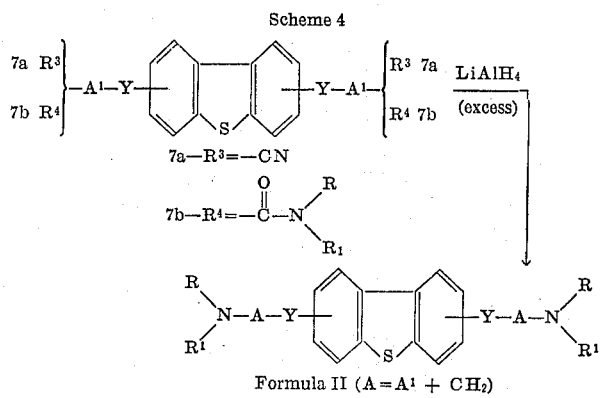

In this scheme of synthesis, R, $R^1$, A and Y have the same meanings specified hereinbefore, and $A^1$ is an alkylene chain having one less methylene, —$CH_2$—, group in a straight chain than does A, that is, $A = A^1 + CH_2$.

The intermediate nitriles, 7a, and amides, 7b, may be prepared by the method illustrated, for example, in Scheme 1 above, in which the appropriate ω-haloalkyl nitriles and amides are substituted for the haloalkyl amines, 2.

According to the method of preparation illustrated in Scheme 4, compounds of Formula II, in which both R and $R^1$ are hydrogen, may be prepared from either the nitriles, 7a, or the unsubstituted amides, 7b, wherein $R = R^1 = H$. Secondary amines, that is, compounds of Formula II wherein R = H and $R^1$ is not H, can also often be prepared by this method from the corresponding secondary amides, 7b, wherein R = H and $R^1$ is not H.

Scheme 5

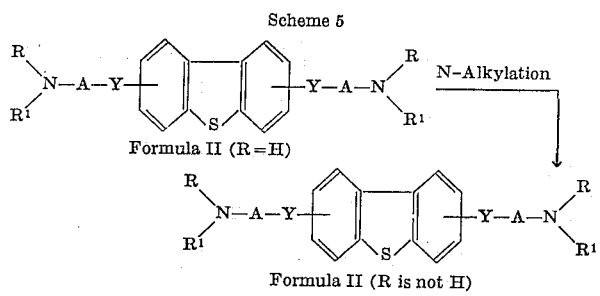

In this scheme of synthesis, $R^1$, A and Y have the same meanings specified hereinbefore, and with the exceptions noted in the two formulas above, R has the same meaning specified hereinbefore.

Alkylation of the primary amines, that is, compounds of Formula II wherein each R and $R^1$ is H, by the method illustrated in Scheme 5 may be used to prepare either the secondary amines, that is, compounds of Formula II wherein R = H and $R^1$ is not H, or the symmetrically substituted tertiary amines, that is, compounds of Formula II wherein $R = R^1$ but neither is H.

One method for preparing the secondary amines, that is, compounds of Formula II wherein R = H and $R^1$ is not H, is the reaction of the primary amines, that is, compounds of Formula II wherein each R and $R^1$ is H with the stoichiometric quantities of the appropriate aldehydes or ketones to yield the corresponding Schiff's bases, which may then be reduced with either a borohydride or molecular hydrogen in the presence of a catalyst, such as platinum or Raney nickel, for example. Another method for preparing the secondary amines is acylation of the primary amines with the appropriate acyl halides or anhydrides, followed by reduction of the N-acyl amines with lithium aluminum hydride.

Reductive alkylation of the primary amines with an excess of the appropriate aldehydes or ketones in the presence of molecular hydrogen and a catalyst, such as platinum or Raney nickel, for example, will yield the symmetrically substituted tertiary amines, that is, compounds of Formula II wherein $R = R^1$ but neither is H. Alkylation of the primary amines with formaldehyde and formic acid by the Eschweiler-Clarke procedure yields the tertiary amines of Formula II in which $R = R^1 = CH_3$.

Alkylation of the primary amines with a large excess of the appropriate halides yields the symmetrically substituted tertiary amines, that is, compounds of Formula II wherein $R = R^1$ but neither is H.

Alkylation of the secondary amines, that is, compounds of Formula II wherein R = H and $R^1$ is not H by the method illustrated in Scheme 5 may be used to prepare either the symmetrically substituted tertiary amines, that is, compounds of Formula II wherein $R = R^1$ but neither is H or the unsymmetrically substituted tertiary amines, that is, compounds of Formula II wherein R and $R^1$ are different and neither is H.

Reaction of the secondary amines with the appropriate halides is one method for effecting N-alkylation. Another useful method is the reductive alkylation of the secondary amines with the appropriate aldehydes or ketones in the presence of molecular hydrogen and a catalyst, such as platinum or Raney nickel, for example. Another useful alkylation method is the two-step method whereby the secondary amines are acylated with the appropriate acyl halides or anhydrides and the resulting N-acyl amines are reduced with lithium aluminum hydride to the corresponding tertiary amines. Alkylation of the secondary amines with formaldehyde and formic acid by the Eschweiler-Clarke procedure is a method for preparing the tertiary amines of Formula II in which $R = CH_3$.

Another useful method for preparing the bis-basic ethers and thioethers represented by Formulas II and III is illustrated in Scheme 6.

This method is equally applicable to the preparation of bis-basic ethers and thioethers represented by Formula III, in which case haloalkylamines of type 6 are substituted for the type 2 haloalkylamines shown in the above illustration.

By the method of Scheme 6, the bis-basic ethers and

Scheme 6

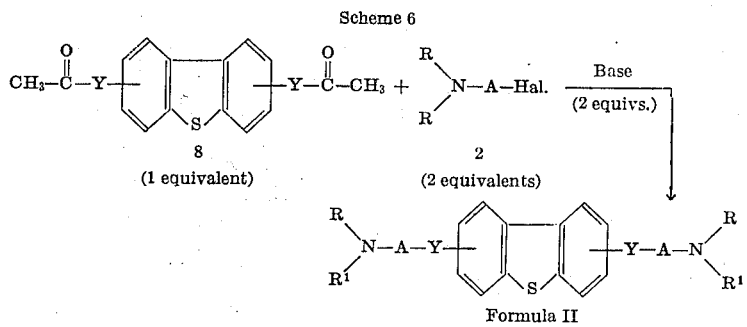

thioethers can be prepared directly from the diacetates of dibenzothiophene-diols and dithiols, that is, compound 8 wherein Y is equal to oxygen or divalent sulfur, which in some cases are more conveniently isolated than are the diols and dithiols, that is, compound 1 wherein Y is equal to oxygen or divalent sulfur, particularly, when the latter are relatively unstable or difficult to purify.

In this procedure, it is often advantageous to use the hydrochloride salt of the haloalkylamine, 2 or 6, in place of the base form, in which case, the amount of base is doubled. Conveniently, the base used can be an alkali alkoxide, such as sodium methoxide, sodium ethoxide and the like. Solvents used in this procedure include aromatic hydrocarbons, such as benzene and toluene, and halogenated aromatics, such as chlorobenzene and the like. Reaction conditions can vary over a wide range with respect to the reaction period and temperature; however, the reaction is generally effected at the reflux temperature of the solvent for a period of 6 to 72 hours. The preferred method is to heat a mixture of compound 8, the hydrochloride salt of compound 2 or 6, and four equivalents of sodium methoxide in refluxing chlorobenzene for 24 hours.

Starting materials which find use in preparing the compounds illustrated in the above reaction schemes and in the specific examples given below are the following dibenzothiophene-diols, that is, compound 1 wherein Y is oxygen: 2,8-dihydroxydibenzothiophene [F.P. Richter and E.W. Fuller (to Socony-Vacuum Oil Co., Inc.), U.S. Pat. No. 2,479,513, Aug. 16, 1949]; and 3,7-dihydroxydibenzothiophene which can be prepared from 3,7-diaminodibenzothiophene [R.K. Brown, N.A. Nelson and J.C. Wood, J. Am. Chem. Soc., 74, 1165 (1952)] by conversion to the tetrazonium salt and subsequent hydrolysis of this salt according to either the procedure of Cullinane et al. for converting 2-aminodibenzothiophene to 2-hydroxydibenzothiophene [N.M. Cullinane, C.G. Davies and G.I. Davies, J. Chem. Soc. (London), 1435(1936)], or the procedure of Barker and Barker for converting 3,6-diaminofluoren-9-one to 3,6-dihydroxyfluoren-9-one [A. Barker and C.C. Barker, J. Chem. Soc. (London), 870(1954)]. The corresponding dibenzothiophene-dithiols, that is, compound 1 wherein Y represents a divalent sulfur atom can be prepared by the thermal rearrangement of the bis-dialkylthiocarbamates of the above described diols, followed by alkaline hydrolysis of the rearranged products, according to the method of Newman and Karnes for the conversion of phenols to thiophenols [M.S. Newman and H.A. Karnes, J. Org. Chem., 31, 3980(1966)].

The diacetates, 8, can be prepared by acetylation of the above described diols and dithiols.

Representative compounds of the present invention and several of the methods of preparing them, mentioned above, are illustrated in the following specific examples:

EXAMPLE 1

2,8-BIS(3-PIPERIDINOPROPOXY)DIBENZOTHIOPHENE DIHYDROCHLORIDE

To 200 ml. of water containing 12.0g. (0.3 mole) of sodium hydroxide and 8.5g. (0.039 mole) of 2,8-dihydroxydibenzothiophene were added 200 ml. of toluene and 19.8g. (0.1 mole) of 3-piperidinopropyl chloride hydrochloride, and the heterogeneous reaction mixture was stirred and heated to reflux for 16 hours. After cooling, the organic layer was washed with water, dried over magnesium sulfate, and concentrated in vacuo. The free base was chromatographed on alumina, using chloroform as the eluant. After removing the chloroform from the fraction collected, the oily residue was dissolved in ether and treated with ethereal hydrogen chloride to give the desired product which was purified by two recrystallizations from methanol-butanone, m.p. 240°–242°, $\lambda_{max.}^{H_2O}$ 233, $E_{1\ cm.}^{1\%}$ 741.

EXAMPLE 2

2,8-BIS[2-(DIMETHYLAMINO)ETHOXY]DIBENZOTHIOPHENE DIHYDROCHLORIDE

To 200 ml. of chlorobenzene was added 16.1g. (0.0745 mole) of 2,8-dihydroxydibenzothiophene, 16.8g. (0.156 mole) of 2-dimethylaminoethyl chloride and 8.3g. (0.154 mole) of sodium methoxide. The mixture was stirred and heated to reflux for 16 hours. The cooled reaction mixture was filtered and the filtrate was washed with several portions of water, then dried over anhydrous magnesium sulfate. The chlorobenzene solution was evaporated in vacuo. The oily residue was dissolved in ether and treated with ethereal hydrogen chloride to give the desired product which was crystallized from methanol-butanone, m.p. 248°–250°, $\lambda_{max.}^{H_2O}$ 233, $E_{1\ cm.}^{1\%}$ 915.

EXAMPLE 3

2,8-BIS[2-(DIETHYLAMINO)ETHOXY]DIBENZOTHIOPHENE BIS-DIHYDROGEN CITRATE

When the appropriate molar equivalent amount of 2-diethylaminoethyl chloride hydrochloride was used in place of 3-piperidinopropyl chloride hydrochloride in the procedure described in Example 1, the free base obtained was treated with a methanol solution of citric acid and the desired product was crystallized from water-ethanol-acetone, m.p. 150°–152°, $\lambda_{max.}^{H_2O}$ 233, $E_{1\ cm.}^{1\%}$ 529.

EXAMPLE 4

2,8-BIS[3-(DIBUTYLAMINO)PROPOXY]DIBENZOTHIOPHENE DIHYDROCHLORIDE

When the appropriate molar equivalent amount of 3-dibutylaminopropyl chloride was used in place of 3-piperidinopropyl chloride hydrochloride in the procedure described in Example 1, the desired product was obtained after crystallization from chloroform-acetone, m.p.155°–157°, $\lambda_{max.}^{H_2O}$ 233, $E_{1\ cm.}^{1\%}$ 642.

EXAMPLE 5

2,8-BIS[2-(DIISOPROPYLAMINO)ETHOXY]DIBENZOTHIOPHENE DIHYDROCHLORIDE

When the appropriate molar equivalent amount of 2-diisopropylaminoethyl chloride hydrochloride was used in place of 3-piperidinopropyl chloride hydrochloride in the procedure described in Example 1, the desired product was obtained after crystallization from chloroform-acetone, m.p. 223°–225°, $\lambda_{max.}^{H_2O}$ 233, $E_{1\ cm.}^{1\%}$ 769.

EXAMPLE 6

2,8-BIS[3-(DIMETHYLAMINO)-2-METHYLPROPOXY]DIBENZOTHIOPHENE DIHYDROCHLORIDE

When the appropriate molar equivalent amount of 3-dimethylamino-2-methylpropyl chloride hydrochloride was used in place of 2-dimethylaminoethyl chloride in the procedure described in Example 2, and the molar equivalent amount of sodium methoxide was doubled, the desired product was obtained after crystallization from methanol-butanone, m.p. 120°–122°, $\lambda_{max.}^{H_2O}$ 233, $E_{1\ cm.}^{1\%}$ 808.

EXAMPLE 7

2,8-BIS(2-PIPERIDINOETHOXY)DIBENZOTHIOPHENE DIHYDROCHLORIDE

When the appropriate molar equivalent amount of N-(2-chloroethyl)piperidine hydrochloride was used in place of 2-dimethylaminoethyl chloride in the procedure described in Example 2, and the molar equivalent amount of sodium methoxide was doubled, the desired product was obtained after crystallization from methanol-acetone, m.p. 281°–283°, $\lambda_{max.}^{H_2O}$ 233, $E_{1\ cm.}^{1\%}$ 753.

EXAMPLE 8

3,7-BIS(3-PIPERIDINOPROPOXY)DIBENZOTHIOPHENE DIHYDROCHLORIDE

When 3,7-dihydroxydibenzothiophene is substituted for 2,8-dihydroxydibenzothiophene in the procedure described in Example 1, 3,7-bis-(3-piperidinopropoxy)dibenzothiophene dihydrochloride is obtained.

EXAMPLE 9

2,8-BIS(3-PIPERIDINOPROPYLTHIO)DIBENZOTHIOPHENE DIHYDROCHLORIDE

When the appropriate molar equivalent amount of dibenzothiophene-2,8-dithiol is substituted for 2,8-dihydroxydibenzothiophene in the procedure described in Example 1, 2,8-bis(3-piperidinopropylthio)dibenzothiophene dihydrochloride is obtained.

EXAMPLE 10

2,8-BIS[2-(DIHEXYLAMINO)ETHOXY]DIBENZOTHIOPHENE DIHYDROCHLORIDE

When the appropriate molar equivalent amount of 2-dihexylaminoethyl chloride hydrochloride is substituted for 3-piperidinopropyl chloride hydrochloride in the procedure described in Example 1, 2,8-bis[2-(dihexyl-amino)ethoxy]dibenzothiophene dihydrochloride is obtained.

EXAMPLE 11

2,8-BIS[2-(ETHYLAMINO)ETHOXY]DIBENZOTHIOPHENE DIHYDROCHLORIDE

A. With stirring 80 ml. of 10 percent aqueous sodium hydroxide is added drop-wise, over a period of 30 minutes, to a mixture of 0.1 mole of 2,8-dihydroxydibenzothiophene and 0.3 mole of 1-bromo-2-chloroethane in 400 ml. of water. With continued stirring the mixture is then heated to reflux for 18 hours. When cool, the supernatant water layer is decanted and the residue dissolved in boiling ethanol. The solid which separates on cooling is filtered and recrystallized from ethanol-chloroform to yield 2,8-bis(2-chloroethoxy)dibenzothiophene.

B. A mixture of 0.05 mole of 2,8-bis(2-chloroethoxy)dibenzothiophene, 1.0 mole of ethylamine, 2.0g. of potassium iodide and 100 ml. of tetrahydrofuran is heated with stirring at 110° for 24 hours in a Parr pressure reactor. The solvent and excess amine are removed in vacuo. The residue is treated with dilute sodium hydroxide and extracted with ether. The ether layer is washed twice with water, dried over anhydrous magnesium sulfate and acidified with ethereal hydrogen chloride. The product is crystallized from methanol-ethyl acetate.

EXAMPLE 12

2,8-BIS(2-AMINOETHOXY)DIBENZOTHIOPHENE DIHYDROCHLORIDE

By substituting hexamine for ethylamine in the procedure of example 11(B) and using slightly more than two molar equivalents of hexamine and two molar equivalents of potassium iodide per molar equivalent of 2,8-bis(2-chloroethoxy)dibenzothiophene, 2,8-bis(2-aminoethoxy)dibenzothiophene dihydrochloride is obtained. The reaction is carried out in a refluxing mixture of ethanol-acetone. The intermediate quaternary complex obtained is decomposed by refluxing with an excess of dilute hydrochloric acid, and the product isolated by a procedure similar to that described in Example 11(B).

EXAMPLE 13

2,8-BIS[6-(DIETHYLAMINO)HEXYLOXY]DIBENZOTHIOPHENE DIHYDROCHLORIDE

This compound can be prepared in two steps by the method of Example 11. The intermediate 2,8-bis(6-chlorohexyloxy)dibenzothiophene is prepared by substituting the appropriate molar equivalent amount of 6-bromo-1 chlorohexane for 2-bromo-1-chloroethane in the procedure described in Example 11(A). Reaction of the above intermediate with an excess of diethylamine by the procedure described in Example 11(B) gives the desired product.

EXAMPLE 14

2,8-BIS[(1-METHYL-3-PIPERIDYL)METHOXY]DIBENZOTHIOPHENE DIHYDROCHLORIDE

This compound is prepared by substituting the appropriate molar equivalent amount of 3-chloromethyl-1-methyl-piperidine for 2-dimethylaminoethyl chloride in the procedure described in Example 2.

What is claimed is:

1. A compound selected from a base of the formula

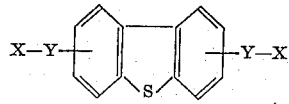

wherein each Y is a member selected from the group consisting of oxygen or divalent sulfur; and each X is the group

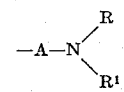

wherein each A is an alkylene chain having from two to eight carbon atoms and which separates the amino nitrogen and Y by at least two carbon atoms; R and R¹ are individually selected from the group consisting of hydrogen, (lower)alkyl having from one to six carbon atoms, cycloalkyl having from three to six carbon atoms, alkenyl of from three to six carbon atoms and having the vinyl unsaturation in other than the 1-position of the alkenyl group; or each set of R and R¹ taken together with the nitrogen atom to which they are attached is a saturated monocyclic heterocyclic group selected from the group consisting of pyrrolidino, piperidino, morpholino, or N-(lower)alkylpiperazino; or a pharmaceutically acceptable acid addition salt of said base.

2. A compound of claim 1 wherein each Y is oxygen.

3. A compound of claim 2 wherein A is an alkylene chain having from two to six carbon atoms; each R and R¹ is (lower)-alkyl having from one to six carbon atoms or each set of R and R¹ taken together with the nitrogen atom to which they are attached is a saturated monocyclic heterocyclic group selected from the group consisting of pyrrolidino, piperidino, or N-(lower)alkylpiperazino and wherein one of the -Y-X groups is in the 2- or 3-position of the dibenzothiophene ring system and the other -Y-X group is in the 7- or 8-position.

4. A compound of the formula

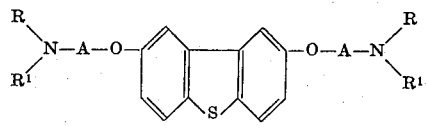

wherein each A is an alkylene chain of two to six carbon atoms; each R and R¹ is (lower)alkyl having from one to six carbon atoms or each set of R and R¹ taken together with the nitrogen atom to which they are attached is a saturated monocyclic heterocyclic group selected from the group consisting of pyrrolidino, piperidino, or N-(lower)alkylpiperazino, or a pharmaceutically acceptable acid addition salt thereof.

5. A compound of claim 4 which is 2,8-bis[2-(dimethylamino)ethoxy]dibenzothiophene or a pharmaceutically acceptable acid addition salt thereof.

6. A compound of claim 4 which is 2,8-bis[3-(dibutylamino)propoxy]dibenzothiophene or a pharmaceutically acceptable acid addition salt thereof.

7. A compound of claim 4 which is 2,8-bis[3-(dimethylamino)-2-methylpropoxy]dibenzothiophene or a pharmaceutically acceptable acid addition salt thereof.

8. A compound of claim 4 which is 2,8-bis[2-(diethylamino)-ethoxy]dibenzothiophene or a pharmaceutically acceptable acid addition salt thereof.

9. A compound of claim 4 which is 2,8-bis[2-(diisopropylamino)-ethoxy]dibenzothiophene or a pharmaceutically acceptable acid addition salt thereof.

10. A compound of claim 4 which is 2,8-bis[2-(piperidino)-ethoxy]dibenzothiophene or a pharmaceutically acceptable acid addition salt thereof.

11. A compound of claim 4 which is 2,8-bis[3-(piperidino)propoxy]dibenzothiophene or a pharmaceutically acceptable acid addition salt thereof.

* * * * *

UNITED STATES PATENT OFFICE
CERTIFICATE OF CORRECTION

PATENT NO. : 3,673,191
DATED : June 27, 1972
INVENTOR(S) : Wm. L. Albrecht, Robt. W. Fleming and Stephen W. Horgan It is certified that error appears in the above-identified patent and that said Letters Patent are hereby corrected as shown below:

On the first page "[73] Assignee: Richards-Merrell, Inc." should read "Richardson-Merrell Inc.". Column 1, lines 10-15

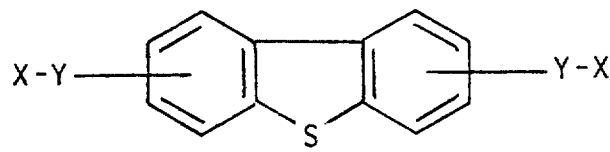

should read

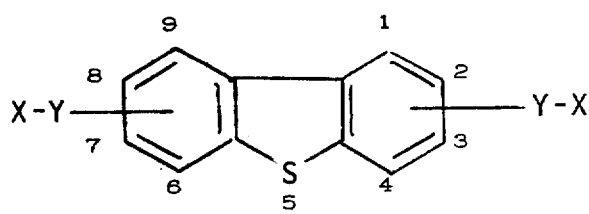

Column 8, lines 58-65

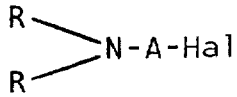

should read

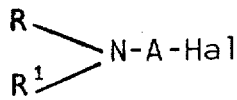

Signed and Sealed this seventh Day of October 1975

[SEAL]

Attest:

RUTH C. MASON
Attesting Officer

C. MARSHALL DANN
Commissioner of Patents and Trademarks